(12) United States Patent
Staton (10) Patent No.: US 9,772,158 B1
(45) Date of Patent: Sep. 26, 2017

(54) GUN SUPPORT SYSTEM

(71) Applicant: Bobby R. Staton, Sheridan, AR (US)

(72) Inventor: Bobby R. Staton, Sheridan, AR (US)

( * ) Notice: Subject to any disclaimer, the term of this patent is extended or adjusted under 35 U.S.C. 154(b) by 6 days.

(21) Appl. No.: 14/997,972

(22) Filed: Jan. 18, 2016

(51) Int. Cl.
*F41A 23/18* (2006.01)
*F16B 2/08* (2006.01)
*F16M 13/02* (2006.01)

(52) U.S. Cl.
CPC ............... *F41A 23/18* (2013.01); *F16B 2/08* (2013.01); *F16M 13/022* (2013.01)

(58) Field of Classification Search
CPC ....... F41A 23/18; F41B 5/1453; A01M 31/02; Y10S 224/913; Y10S 224/916
See application file for complete search history.

(56) References Cited

U.S. PATENT DOCUMENTS

| | | | |
|---|---|---|---|
| 3,022,898 A | 2/1962 | Loeb | |
| 3,819,094 A * | 6/1974 | Hyde | F41C 33/00 224/246 |
| 4,144,971 A * | 3/1979 | Balibrea | F41A 23/18 211/64 |
| 5,975,389 A * | 11/1999 | Braun | A01M 31/02 182/187 |
| 6,086,031 A | 7/2000 | Renfro | |
| 6,419,097 B1 | 7/2002 | Anderson | |
| 7,137,511 B1 * | 11/2006 | Crowell | F41A 23/18 211/4 |
| 7,165,750 B2 * | 1/2007 | McCuskey | F41A 23/18 248/214 |
| 7,296,658 B1 * | 11/2007 | Pederson | A01M 31/02 182/133 |
| 7,971,685 B2 * | 7/2011 | Simone | A01M 31/02 182/133 |
| 2009/0159540 A1 * | 6/2009 | Meeks | F41A 23/18 211/64 |
| 2012/0193254 A1 * | 8/2012 | Kubiniec | A47B 81/005 206/317 |
| 2014/0263516 A1 * | 9/2014 | Habberstad, Jr. | A01M 31/02 224/576 |
| 2014/0332315 A1 * | 11/2014 | Moore | A01M 31/02 182/129 |
| 2015/0230612 A1 * | 8/2015 | Weber, Jr. | A47C 4/021 297/130 |
| 2015/0377578 A1 * | 12/2015 | Tucker | F41A 23/18 248/309.4 |

* cited by examiner

*Primary Examiner* — Bradley Duckworth
(74) *Attorney, Agent, or Firm* — Rashauna Norment (57) ABSTRACT

A gun support system for supporting a firearm on a tree without permanently altering the tree. The gun support system has a supporting means for supporting a firearm, a mounting means for placing the gun support system against the tree, and an attachment means for temporarily attaching the gun support system to the tree. The supporting means allows the firearm to rest in a substantially upright position against it for easy and ready access by the user. The attachment means is adjustable for use on trees having different diameters. When disassembled, the gun support system is compact and lightweight for ease in transport and storage.

17 Claims, 8 Drawing Sheets

GUN SUPPORT SYSTEM

CROSS-REFERENCE TO RELATED APPLICATIONS

Not applicable.

FEDERALLY SPONSORED RESEARCH AND DEVELOPMENT

Not applicable.

BACKGROUND OF THE INVENTION

1. Field of the Invention

The present invention generally relates to a gun support system, and more particularly, it relates to a portable gun support system for supporting a firearm against a tree or any other upstanding support surface.

2. Description of Arguably Related Art Including Information Disclosed for 37 CFR 1.97 and 1.9

Gun support systems, including, without limitation, gun racks and gun holders, have been around for many years for hunters to hold their firearms while in the field. Hunters often desire placing their firearms against the trunk of a tree or other upstanding support surface so that the hunters can have their hands free for other uses. Examples of hunting where these gun support systems are used include, without limitation, deer, turkey, ducks, and other wild game. A hunter or user may utilize any number of firearms when hunting, including, without limitation, any type of shotgun, rifle, or other projectile emitting weapon. It is beneficial to a hunter to have his firearm nearby and accessible without the firearm being directly held in his hands when not in use. For example, when the firearm is supported on the tree and not in use, the hunter is able to keep his hands warm, to access other tools and game calls, to stay alert while waiting for wild game to appear, to use both hands, or to freely move while the gun remains safely pointed upwardly.

Gun support systems that are mountable or otherwise attachable to a tree do exist, but each of these poses significant problems when supporting a firearm on a tree while maintaining ready accessibility of the firearm. Some of these gun support systems require permanent changes to an upstanding support surface, namely a tree trunk, by drilling or otherwise semi-permanently affixing the gun support system to the tree. These changes are unsuitable and unacceptable in areas where the user may be hunting on land that he does not own. Some hunters use strap components from tree stand ladders to hold the firearm against the tree, but these straps cannot be used outside or away from the tree stand.

Other gun support systems may be temporarily attached to the tree; however, the structure of these gun support systems fail to adequately support the firearm while also providing easy and ready access to the firearm whenever needed. These gun support systems are also time-consuming and too loud to assemble in the field. They are also bulky and require significant storage space when travelling. Many of these gun supports are not universal for use and firearm retrieval by both left-handed and right-handed users because those systems cannot be installed in either direction on the tree. Furthermore, many of the strap members that are provided with game cameras, ladders, and other support systems are only six inches or less in length and cannot be used to encircle larger tree trunks.

U.S. Pat. No. 3,022,898 issued to Loeb discloses a gun rest for supporting a gun on an upstanding support. The gun rest comprises a single flexible strap member having a buckle assembly for adjusting the length of the strap member, wherein the strap member encircles a tree trunk; and a mounting means having a bar and two U-shaped support members for supporting the gun parallel to the ground. The U-shaped support members are open upwardly so that the weapon is placed parallel to the ground. None of these support members support the butt or bottom of the firearm. This gun rest also does not allow for universal access for left-handed or right-handed use.

U.S. Pat. No. 6,086,031 issued to Renfro discloses a gun and beverage support system for supporting a weapon and a beverage container on a tree. The gun and beverage support system comprises a base; a pair of hooks affixed at the opposite ends of the base, wherein the hooks support a weapon parallel to the ground; a plurality of eyelets secured to the base and a strap; and a spike for penetrating the tree for grip support. The location of the strap and the eyelets is permanently affixed to the base. This support system also does not allow a user to retrieve the firearm from either side of the system for left-handed or right-handed use.

U.S. Pat. No. 6,419,097 issued to Anderson discloses an archery bow and gun support system for supporting an archery bow and a shotgun on a tree. The archery bow and gun support system comprises a male shotgun mount having a hole mateable with a magazine tube; a female mount having a plurality of holes mateable with a desired surface. The male shotgun mount is semi-permanently attached to the shotgun; and a strap encircles the tree. The gun is supported in an upstanding position, but appears to be unsteady due to the lack of a lower support.

A need exists for an improved gun support system that attaches to a tree for temporarily supporting a firearm, while allowing for easy and ready access to the firearm whenever desired.

A need exists for an improved gun support system that is easy and quiet to assemble and install in the field, and that is cost-effective and lightweight.

A need exists for an improved gun support system that is easy to disassemble and that allows for compact storage.

A need exists for an improved gun support system that is universal to allow a firearm to be hung by both left-handed users or right-handed users for access to the firearm from either side of the tree, allowing the firearm to be removed safely toward the user for better control and access of the firearm.

A need exists for an improved gun support system that has adjustable straps for encircling trees or other upstanding support surfaces of various diameter sizes.

A need exists for an improved gun support system that does not permanently alter or drill into the tree during use or installation.

A need exists for an improved gun support that allows a firearm to be supported substantially parallel to the tree, keeping the muzzle pointed upwardly to avoid accidental discharge.

A need exists for an improved gun support system that allows the user to adjust the hold the firearm snug by slightly bending or pressing the receiving member of the upper part of the gun support system.

SUMMARY OF THE INVENTION

Due to the described disadvantages inherent in the known types of gun support systems, the present invention provides a new and improved gun support system that temporarily attaches to nearly any size tree without drilling into the tree, that allows easy and ready access to a firearm, and that supports various types of firearms. It is understood that the present invention is not limited in its application to the details of construction and to the arrangement of the components described in the following illustrated drawing or in the detailed description.

In one embodiment, the invention is an improved gun support system comprising (including or having) a supporting means for supporting a firearm, the supporting means comprising a first support member and a second support member; a mounting means for mounting the supporting means thereto and for engaging with an attachment means, the mounting means comprising at least one rod having opposing ends, with each end of the rod being engageable with each of the support members, respectively; and the attachment means removably attaches the gun support system against an upstanding support surface, wherein the attachment means comprises at least one attachment member.

In another embodiment, the invention is an improved gun support system for supporting a firearm on a tree, the gun support system comprising (including or having)
 a. a supporting means for supporting the firearm, the supporting means comprising a first support member for supporting the upper portion of the firearm and a second support member for supporting the lower portion of the firearm, each of the support members is a brace for substantially abutting and bracing the gun support system against the tree, wherein the brace comprises a receiving member for receiving and supporting the firearm;
 b. a rod having two opposing ends for mounting each of the support members thereto and for engaging with an attachment means; and
 c. the attachment means comprising a plurality of attachment members, each of the attachment members comprising a first end, a second end, an adjusting means for adjusting the ends of the attachment member around the upstanding support surface having different diameters, and a securing member for detachably securing the ends of the attachment members together, wherein each of the attachment members is adjustable and temporarily attachable to the tree without drilling or impacting the tree, and wherein at least a first of the plurality of the attachment members is attachable over an upper portion of the rod and around the tree and at least a second of the plurality of the attachment members is attachable over a lower portion of the rod and around the upstanding support surface.

In yet another embodiment, the invention is an improved gun support system for supporting a firearm on or against a tree, the gun support system comprising (including or having)
 a. a first support member and a second support member, the first support member for supporting the upper portion of the firearm and the second support member for supporting the lower portion of the firearm, each of the support members having a brace for substantially abutting and bracing the gun support system against the tree and a fastener for engaging with a rod; the brace comprising a flange forming a substantially obtuse angle for substantially abutting the tree, and a U-shaped receiving member for receiving and supporting the firearm, wherein the U-shaped receiving member of the first support member further being adjustable for cradling the upper portion of the firearm, wherein the firearm seats against and is supported by the receiving member; and the second support member further comprising a stop member, wherein the stop member supports the bottom of the firearm; the support members being selectively oriented for access and retrieval of the firearm from either the left or the right of the gun support system;
 b. the rod comprising a first portion and a second portion, each of the portions having an externally threaded end and an opposing end having shorter external threads, wherein the shorter externally threaded ends of the portions of the rod are connectable with a fastener, wherein each opposing end of the rod is engageable with the fastener of each of the support members, and wherein the rod further engages with an attachment means; and
 c. the attachment means comprising at least two strap members, each for attaching the gun support system in a substantially parallel configuration on or against the tree.

The gun support system can be used by or accessed by either the left-hand (or left side of the system) and the right-hand (or right side of the system). The system is made from a lightweight non-corroding material for years of use. It is also made for safer conditions, better control, ease of calling wild game and keeping warm. The safety aspect of having the hands free are tremendous. It keeps the muzzle pointed upwardly for safety.

It is an object of the present invention to provide an improved gun support system that attaches to a tree for temporarily supporting a firearm, while allowing for easy and ready access to the firearm whenever desired.

It is another object of the present invention to provide an improved gun support system that is easy and quiet to assemble and install in the field, and that is cost-effective and made from a lightweight material.

It is another object of the present invention to provide an improved gun support system that has adjustable strap members for encircling trees or other upstanding support surfaces of various diameter sizes, wherein the strap members are at least eight feet long.

It is another object of the present invention to provide an improved gun support system that does not permanently alter or require drilling into the tree during use or installation.

It is an object of the present invention to provide an improved gun support system that is compact and easy to store during transport or nonuse.

It is a further object of the present invention to provide a universal left-hand or right-hand application of the device so a firearm can be removed from the gun support, allowing for better control over the firearm.

It is another object of the present invention to provide an improved gun support system made of aluminum or steel for use outdoors so that the gun support system will not rust or corrode from exposure to the elements outside.

It is another object of the present invention to provide an improved gun support system having an upper support member that can be manipulated to hold the upper part of the gun snugly and more securely.

These and other aspects, objects, embodiments, and advantages of the invention will become apparent from the accompanying drawing and the following detailed description of the preferred embodiments of the invention.

BRIEF DESCRIPTION OF THE SEVERAL VIEWS OF THE DRAWING

The invention may be more readily described by reference to the accompanying drawing figures and the following description of the drawing figures. The reference numbers apply to each embodiment of the invention. In the drawing.

Figure 1:
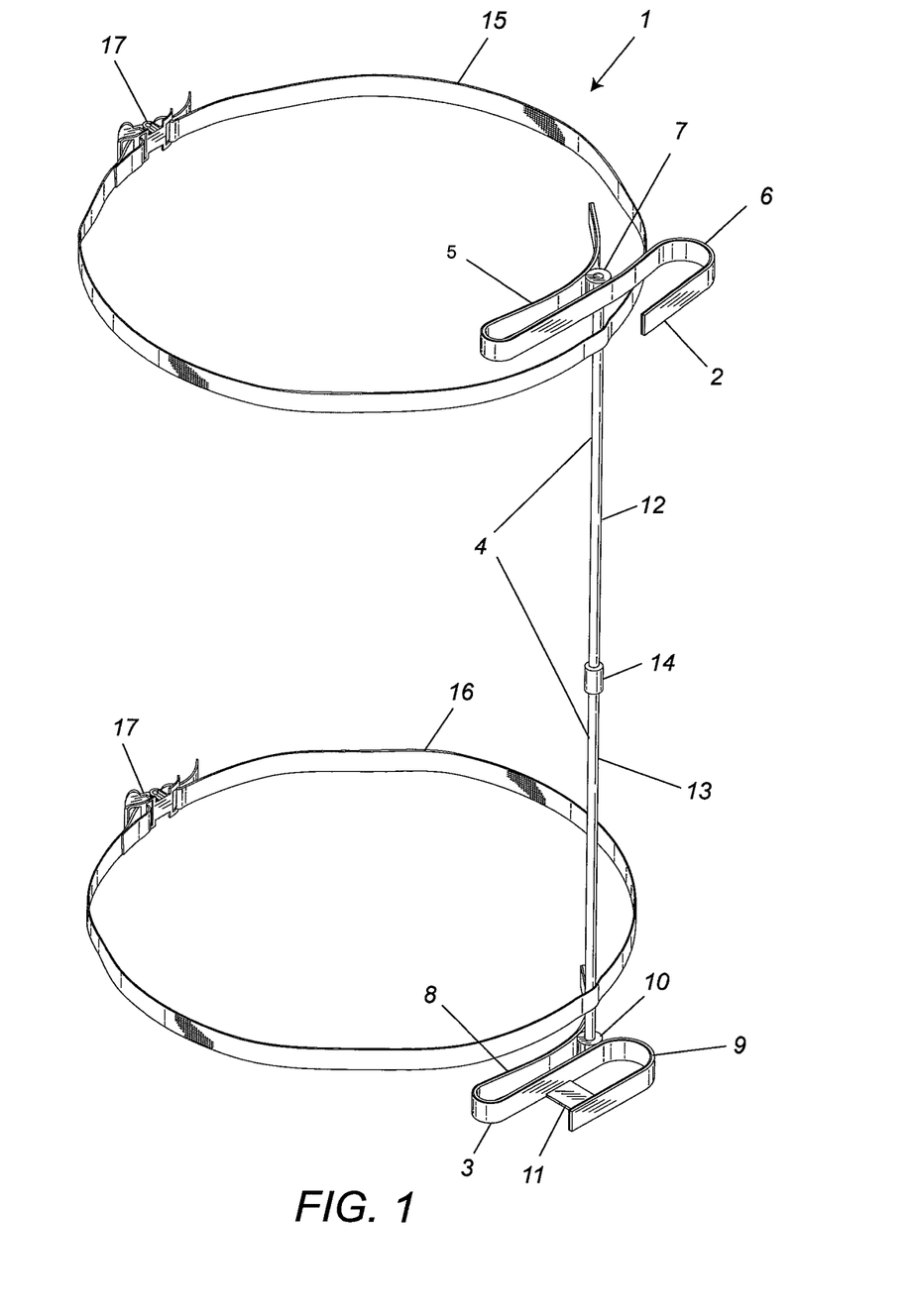
FIG. 1 is a perspective view of an embodiment of a gun support system, showing an assembled configuration wherein a rod has two portions.
Figure 2:
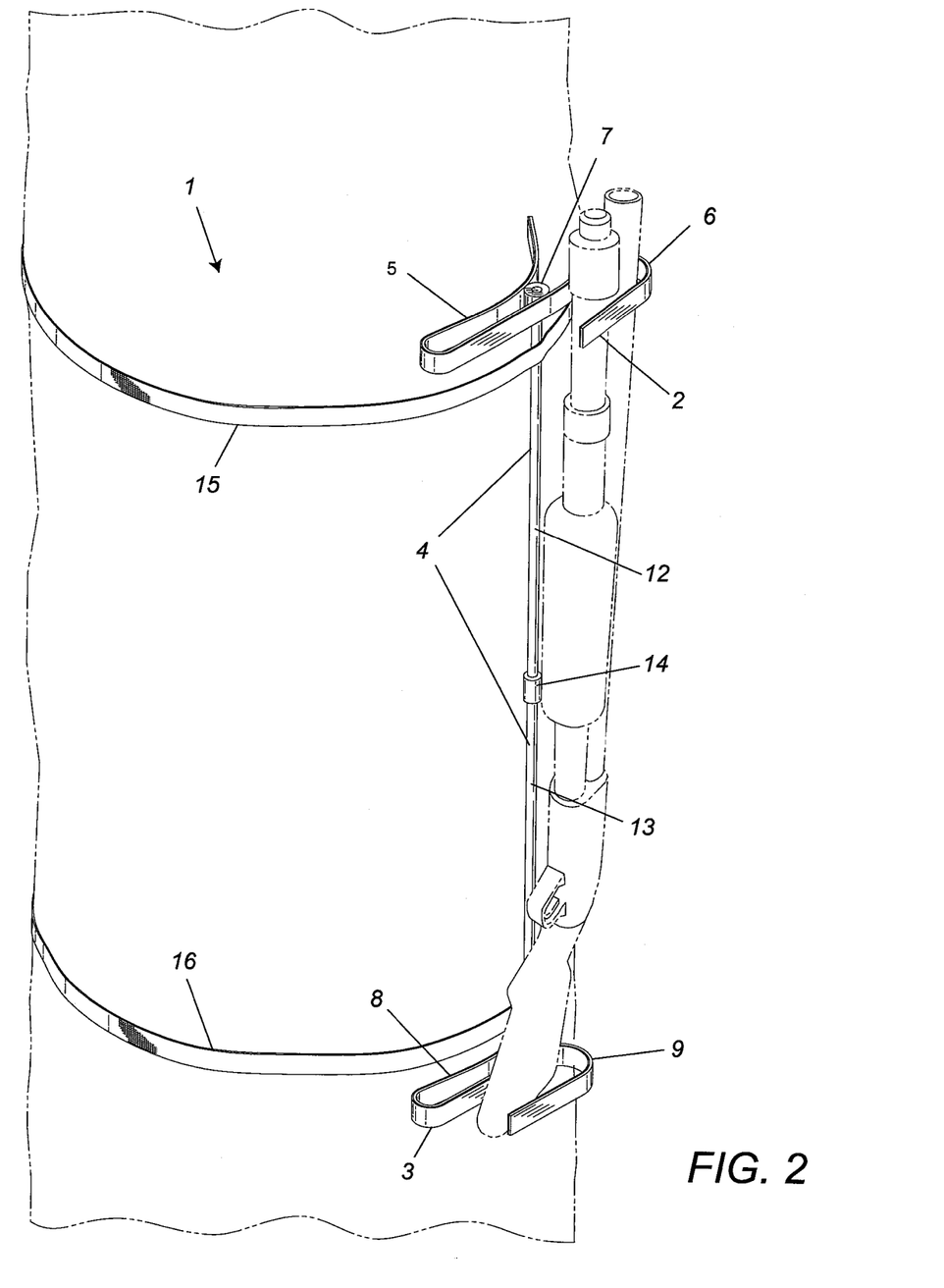
FIG. 2 is a perspective view of the gun support system thereof, shown in an environmental state.
Figure 3:
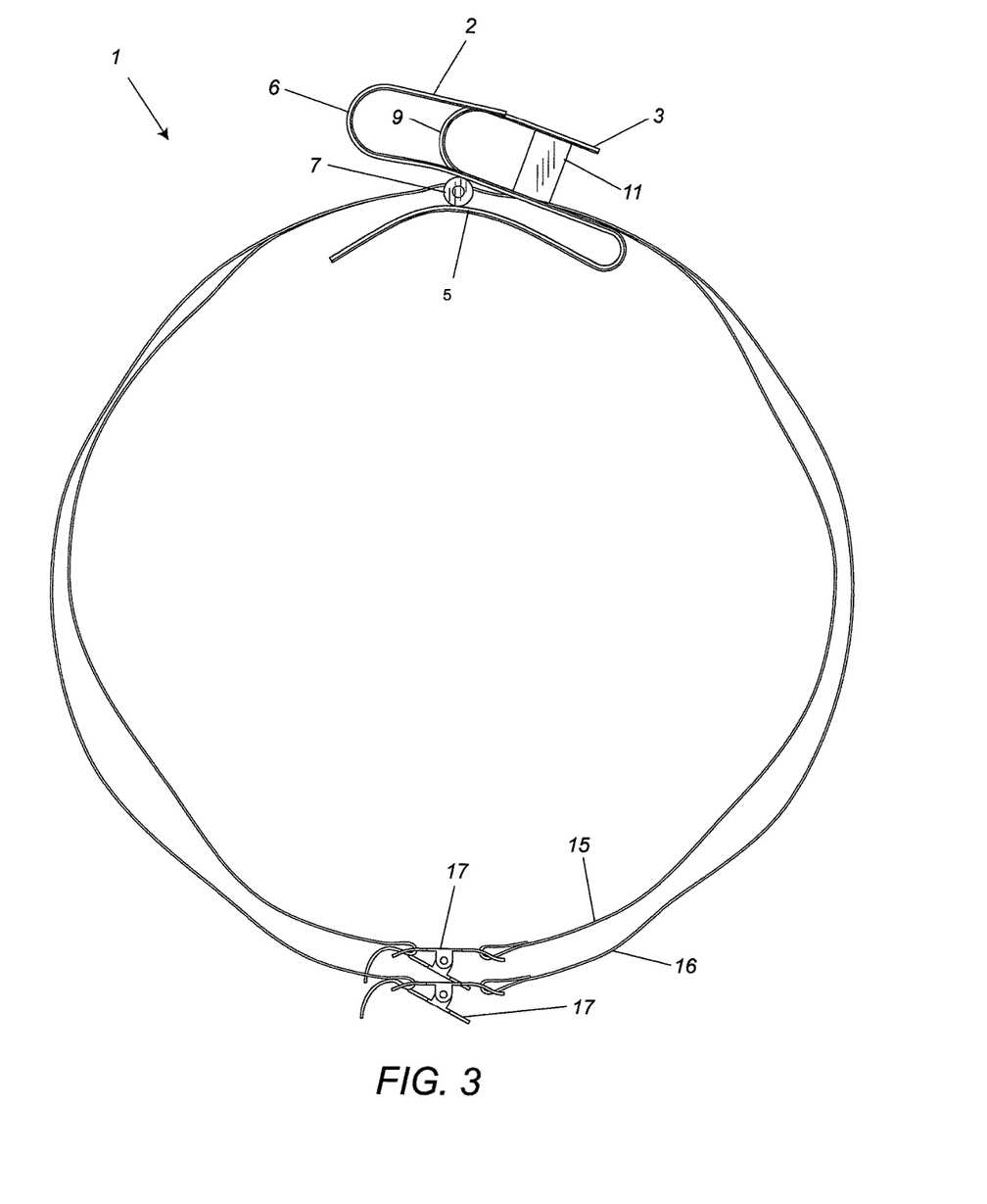
FIG. 3 is a top plan view of the FIG. 1 thereof.
Figure 4:
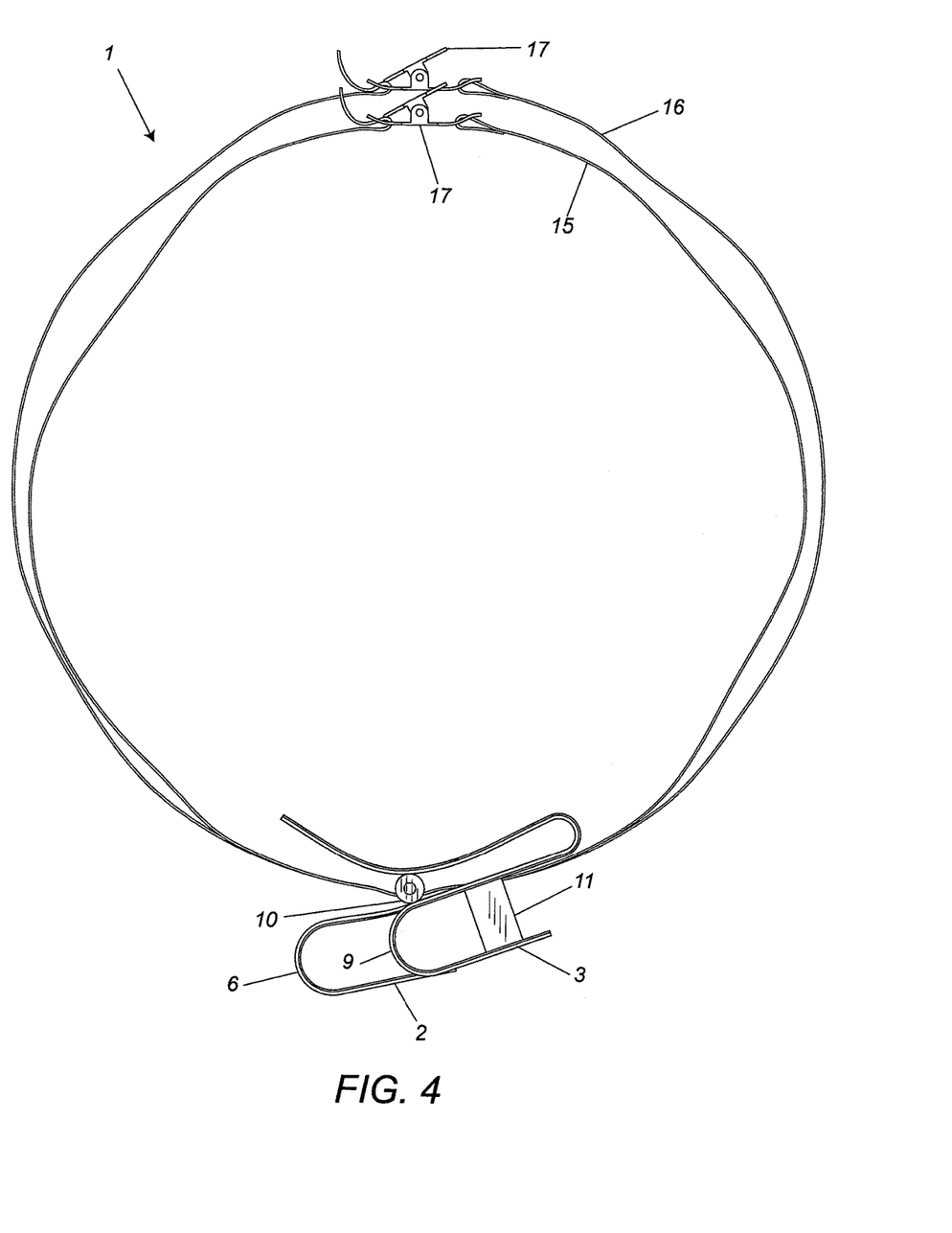
FIG. 4 is a bottom plan view of the FIG. 1 thereof.
Figure 5:
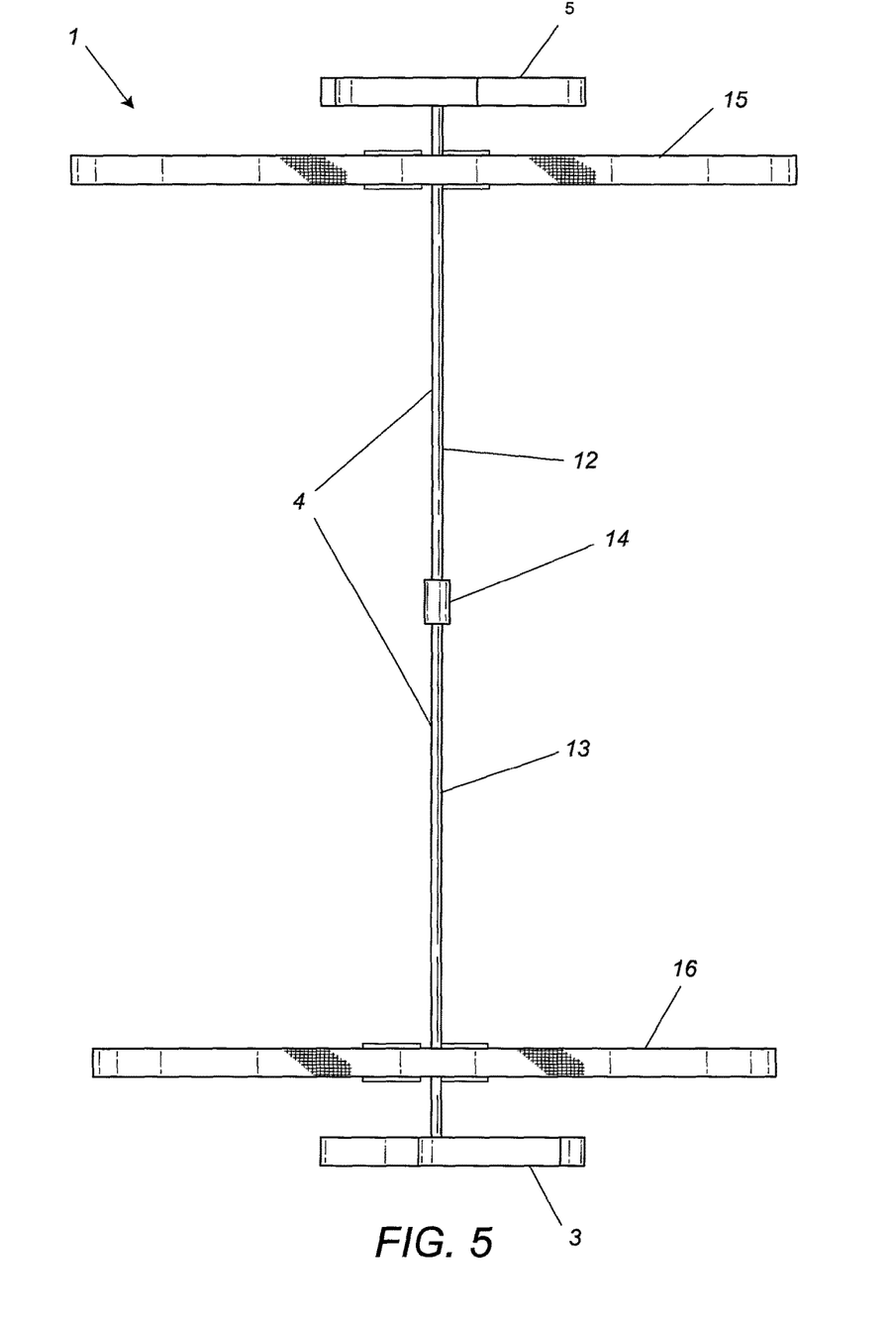
FIG. 5 is a front elevation view of the FIG. 1 thereof.
Figure 6:
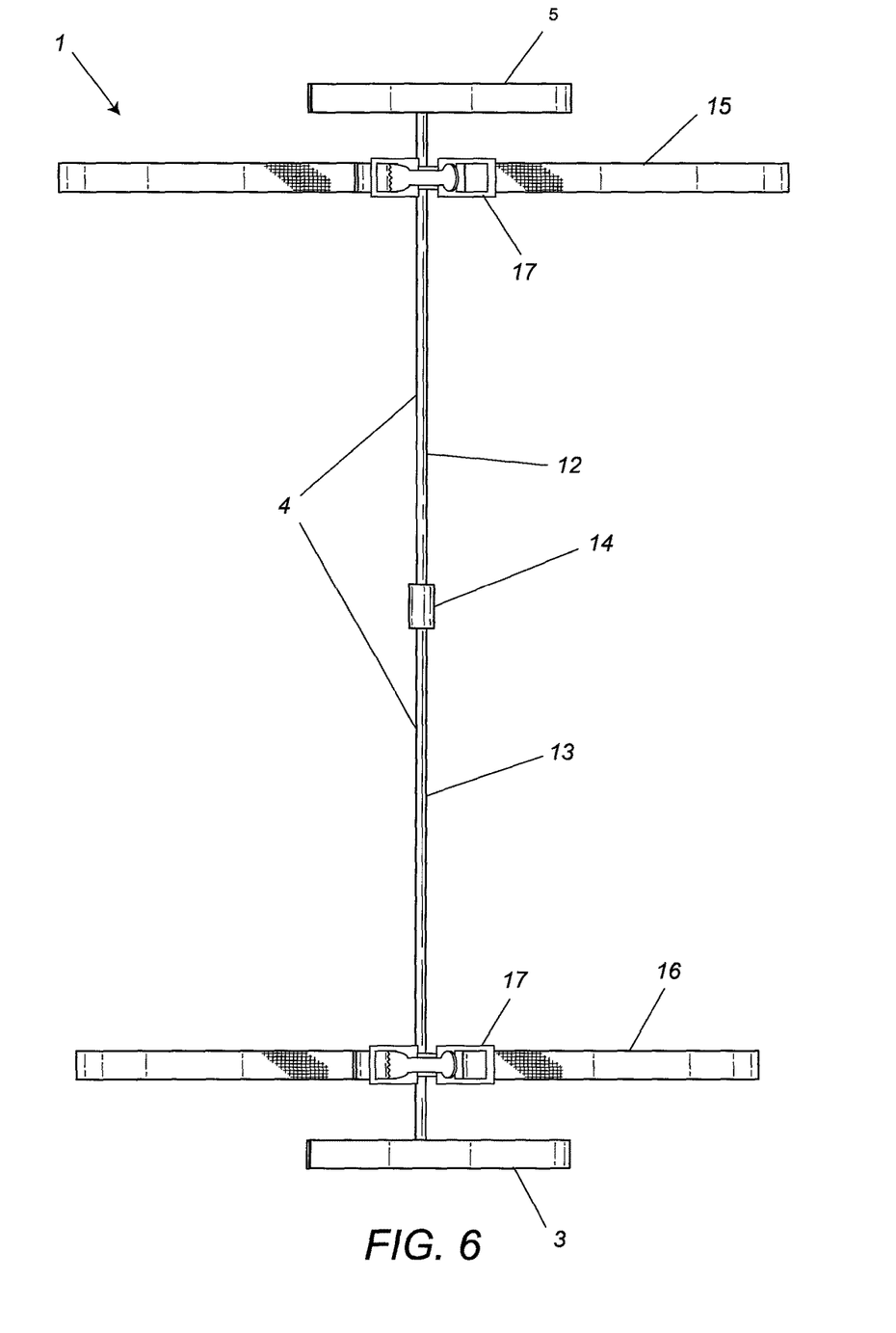
FIG. 6 is a rear elevation view of the FIG. 1 thereof.
Figure 7:
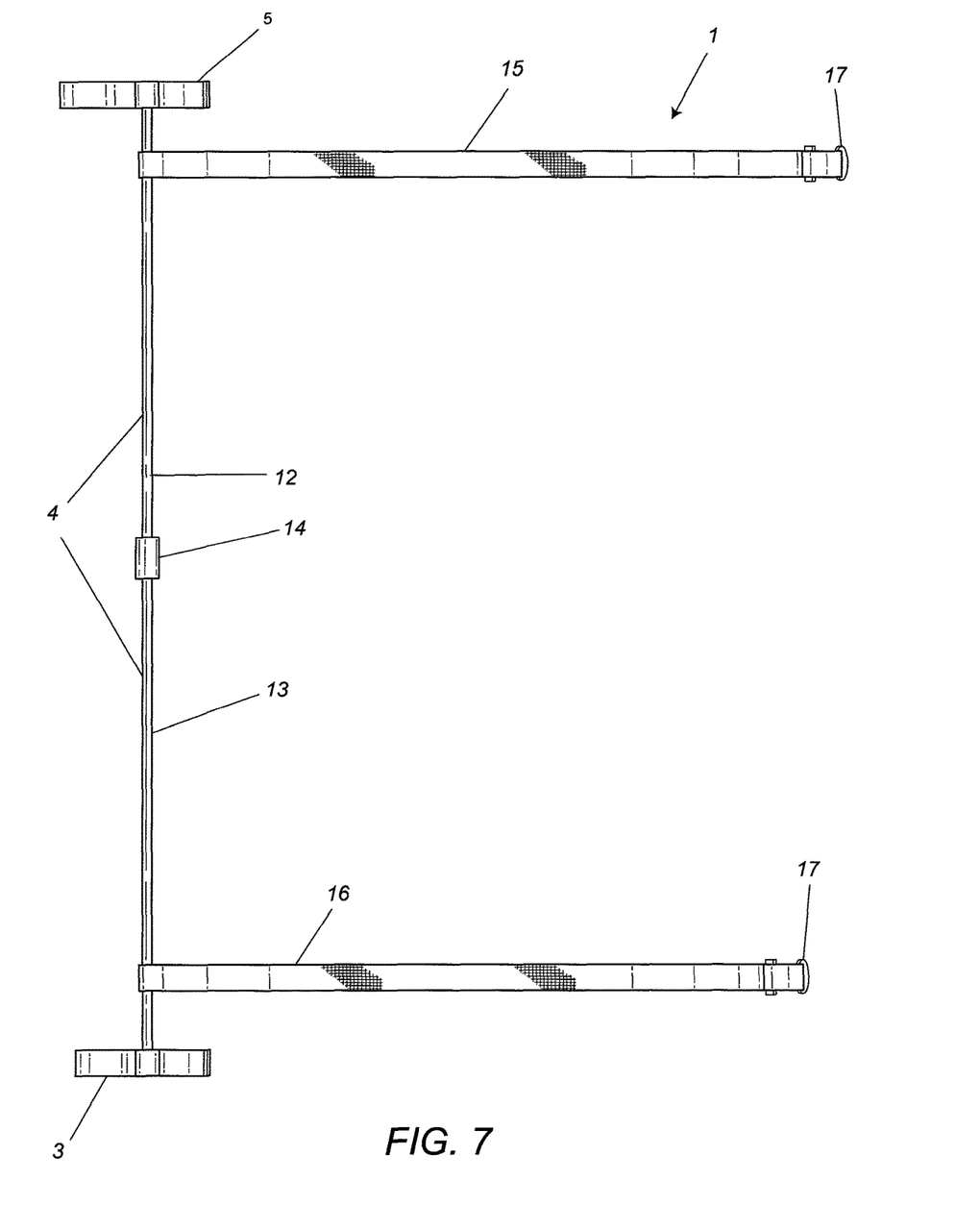
FIG. 7 is a right side elevation view of the FIG. 1 thereof.
Figure 8:
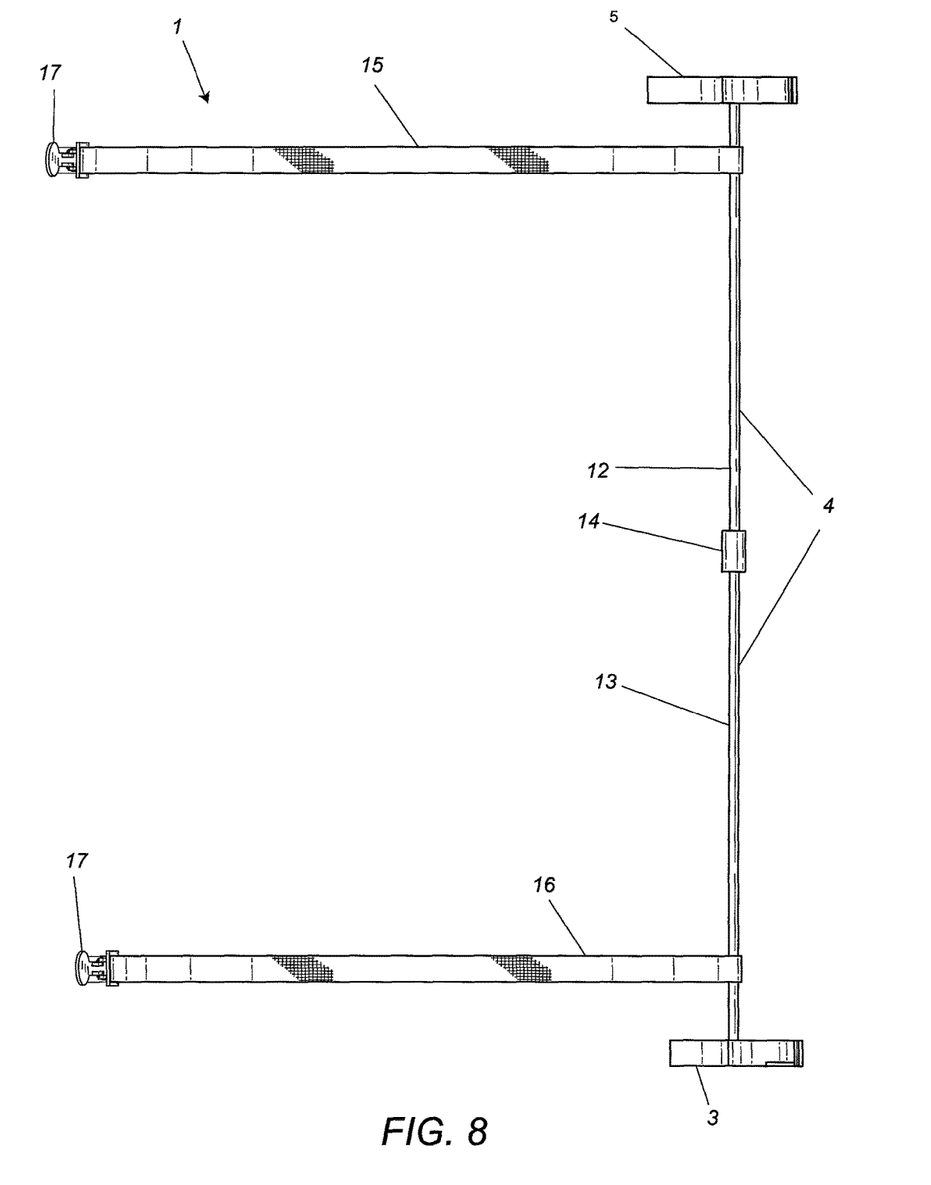
FIG. 8 is a left side elevation view of the FIG. 1 thereof.

The broken lines shown in FIG. 2 represent unclaimed subject matter and form no part of the claimed design. The gun support system's first and second support members can each be installed in the opposite direction for access, use, or retrieval from the opposite side; the corresponding views are not shown because they are similar to FIGS. 1-8.

DETAILED DESCRIPTION OF THE INVENTION

The present invention, preferred embodiments of the invention, and the accompanying drawing figures as described herein should not be construed as limited to the illustrated drawing. Rather the illustrated embodiment(s) are detailed to provide a thorough disclosure suitable to convey the scope of the invention to those skilled in the art. For the sake of simplicity, the conjunctive "and" may also be taken to include the disjunctive "or," and vice versa, whenever necessary to give the claims of this patent application the broadest interpretation and construction possible. Likewise, when the plural form is used, it may be taken to include the singular form, and vice versa.

Referring more particularly to the drawing by characters of reference, FIGS. 1 and 2 depict a new and improved gun support system for supporting a firearm against a tree or other upstanding support surface. In general, the gun support system comprises (includes or has) (a) a supporting means for supporting a firearm; (b) a mounting means for removably mounting the supporting means thereto; and (c) an attachment means for attaching the gun support system against the upstanding support surface. Examples of firearms that may be supported by this gun support system, include, without limitation, any type of rifles, shotguns, long guns or other similar weapons that emit projectiles.

The gun support system essentially hangs on or against the tree without causing damage to the tree. Drilling spikes, disfiguring or otherwise permanently altering the tree upon which the gun support system is installed is not required. The gun support system's components are easy, quick, and quiet to assemble when in the field. Not only is the gun support system a cost-effective tool for a hunter or other user, but it is also lightweight and compact for storage when disassembled. Even if some users desire to keep the gun support system in its assembled state, the assembled gun support system remains slender in size and can still be easily stored.

This gun support system has multiple customizable options. The length of the attachment means is adjustable so it can adequately encircle trees having different diameters. This gun support system allows the hunter to have his hands free for game calling and for keeping his hands from getting tired while holding the firearm for long periods of time. Due to the structure of the supporting means cradling the firearm, a user can easily and readily access the firearm from either from the left or the right side of the gun support system, depending on how the supporting means was installed.

The supporting means supports the firearm, preferably, in a substantially upright position. In a preferred embodiment, the supporting means has a first support member and a second support member. Each of the support members is insertable over the respective ends of the mounting means. Here, the mounting means is a rod having two opposing externally threaded ends. The first support member is an upper support member and is inserted over an end of the rod, then fastened with a fastener. The second support member is a lower support member and is inserted over the opposite end of the rod, then fastened with a fastener.

Each fastener is preferably a spacer nut, and more preferably, a spacer nut defining a hole with internal threads. In a preferred embodiment, three spacers are used to join the components of the invention. A first and second spacer nut 7, 10 each defining an internally threaded hole, are welded, mounted, or otherwise affixed to each of the first and second support members, 2, 3 respectively, to receive and engage with the respective externally threaded ends of the rod; and a third spacer nut 14 defining an internally threaded hole rotatably connects the two rod portions together to form a single rod being at least thirty inches long.

The upper, first support member 2 is essentially an S-shaped brace 2 having a flange 5 curving into a substantially U-shaped receiving member 6 for supporting the firearm. In the figures, the flange 5 forms a substantially obtuse angle for bracing the upper part of the gun support system 1 against a tree. The upper portion of the firearm slides into U-shaped bend of the receiving member 6, as shown in FIG. 2. The U-shaped receiving member 6 is slightly offset and larger than the second U-shaped receiving member 9 so that the firearm will rest and lean against it due to gravity and the weight of the firearm. FIG. 2 illustrates that the U-shaped receiving member also adjusts for a more secure fit against the firearm by pressing (or expanding) the free end of the receiving member toward (or away from) the upper end of the receiving member. A spacer nut 7 is welded or otherwise mounted between the bottom of the flange 5 and above the U-shaped receiving member 6. Before being configured in the S-shaped brace, the upper, first support member is 20½ inches long. The spacer nut 7 defines a hole therethrough for engaging with an end of the rod 4. In one embodiment, the spacer nut is positioned behind the angle of the flange, as shown in FIG. 1.

The lower, second support member 3 is essentially an S-shaped brace 3 having a flange 8 curving into a substantially U-shaped receiving member 9. The flange 8 forms a substantially obtuse angle for bracing the lower part of the gun support system 1 against the tree. The second support member 3 further includes a stop member 11. The stop member 11 is substantially perpendicular to the upper and lower ends of the receiving member 6, 9. In FIG. 2, the stock or butt of the firearm is supported by and rests against the stop member, in part to prevent the firearm from slipping through the opening of the lower receiving member. In an embodiment, the stop member 11 is positioned substantially midway and centered at the width of the arms of the receiving member 9. This midpoint location of the stop member allows for the firearm to still rest against stop member even if second support member to be installed in a flipped configuration for access from the opposite side of the system. A spacer nut 10 is welded or otherwise mounted between the bottom of flange 8 and above the receiving member 9. The spacer nut 10 defines an internally threaded hole therethrough for engaging with an end of the rod 4. Before being configured into the S-shaped brace, the lower second support member is 18⅝ inches long. The receiving member of the first support brace is configured to have a deeper bend when compared to the receiving member of the second support brace.

Once assembled as shown in the figures, the gun support system is oriented so that the mounting means is held substantially in an upright position, with the first support member 2 being above the second support member 3 along the mounting means 4. Each support member is installed substantially parallel with the other and with the ground. To allow the user some flexibility in choice of firearms the first support member has a receiving member that is deeper than the second support member's receiving member to allow the firearm to lean and seat back into the gun support to remain in a substantially upright position.

The interchangeability or universal feature of the gun support system allows a user to retrieve the firearm from the right side or left side of the gun support system. More particularly, the support members can be flipped over 180° and assembled as described herein, with the firearm being cradled from the opposite side of the gun support system. The user should ensure that the support members are being assembled in the same direction.

Each support member further includes at least one layer of foam rubber or padding (not shown) on the flange and the receiving member. The foam rubber on the obtuse angle side of flange aids in keeping the support member from slipping off and away from the tree. The foam rubber on the receiving side of the receiving member aids in keeping the metal support member from scratching or scarring the finish on the firearm. The gun support system further includes a carrying bag for holding the disassembled components. The carrying bag may be made from canvas or nylon, and may be closed with hooks and loops or a drawstring.

The mounting means is removably mountable to the supporting means and it also engages with the attachment means. Depending on the tautness of the attachment means during installation, the mounting means abuts or otherwise rests substantially parallel against the tree. The mounting means may be positioned at nearly any height along the tree.

In a preferred embodiment, the mounting means is essentially a rod 4 having two opposing externally threaded ends. Each end of the rod 4 is insertable into the hole of each respective spacer nut 7, 10 of the first and second support members 2, 3. The ends of the rod 4 are interchangeable and can be inserted into either spacer nut 7, 10 of the support members 2, 3.

In a preferred embodiment, the rod 4 is further separable into a first portion of the rod 12 and a second portion of the rod 13. The two portions of the rod allow for compact storage and ease in carrying the disassembled gun support system. The first portion of the rod 12 has two opposing externally threaded ends, with one of the ends having fewer external threads ("shorter externally threaded end") (not shown) for engaging with a fastener 14. The second portion of the rod 13 has two opposing externally threaded ends, with one of the ends having a shorter externally threaded end (not shown) for engaging with the fastener 14. Here, the fastener is a spacer nut defining an internally threaded hole therethrough. The shorter threaded ends of the first and second portions of the rod are each rotatably engaged with the spacer nut 14 to form a single, elongated, streamlined rod. In this configuration, the rod still has its opposing ends being externally threaded for engaging with spacer nuts 7, 10 of the first and second support members, 2, 3 respectively. The rod, including any portions thereof, can have different lengths. In a preferred embodiment, the length of each rod portion is at least fifteen inches, with both rod portions totaling at least thirty inches in length when assembled with the spacer. The two fifteen-inch rod portions are externally threaded on each end. In another embodiment, rather than two portions of the rod having shorter externally threaded ends for engaging with the spacer nut 14, these end sections define at least one hole for inserting a pin to attach the rod portions together. Each of the support members and the rod may be made from any sturdy, lightweight material including, without limitation, aluminum, steel, or stainless steel. Stainless steel is preferred, particularly for the rod. One reason stainless steel is preferred is to prevent the threads from being stripped as the rod rotatably engages with the spacer nuts 7, 10, 14. Aluminum may also be used.

The attachment means allows the gun support system to be removably attachable to nearly any tree or upstanding support surface having different diameters. The attachment means allows the user to position and secure the gun support system at nearly any height or location on the tree. The attachment means essentially encircles, loops around, or otherwise surrounds the tree, then is fastened upon itself without the need to drill spikes into the tree for support.

The attachment means comprises at least one attachment member 15 that encircles the tree to attach to the gun support system 1 to the tree, and it further includes a securing member 17 for securing the attachment member. In one embodiment, a plurality of attachment members is used to attach the gun support system to the tree at different points along the rod. In a preferred embodiment, two attachment members 15, 16 are used to encircle the tree, with a first attachment member 15 being an upper attachment member for attaching the upper portion of the rod to the tree, and a second attachment member 16 being a lower attachment member for attaching the lower portion of the rod to the tree.

In FIG. 1, each attachment member further has an adjusting means for adjusting the length of the attachment member when surrounding or encircling the tree, and a first end and a second end of the attachment member. Each end has a reusable mateable securing member 17 for securing the ends of the attachment member together once it is installed around the tree. The attachment members are flexible, sturdy, and lightweight for use with the invention.

Each attachment member 15, 16 is placed over the respective positions over the rod. Each attachment member is a flexible strap member. The strap members may be spaced apart along the length of the rod as desired. Each strap member is at least eight feet long to accommodate most trees having a large diameter, however, each strap member can be adjusted for use around a tree having a small diameter by tightening the adjusting means. The adjusting means and the securing member for each attachment member may be selected from the group consisting of hooks and loops, buckles, cinches, and combinations thereof.

To assemble the gun support system, the direction of access to the firearm is selected, then the hole of the spacer nut of the upper first brace is aligned and inserted over an end of the rod and rotatably fastened. The hole of the spacer nut of the lower second brace is aligned and inserted over the opposite end of the rod and rotatably fastened. In an embodiment wherein the rod is a separable rod having two portions, the shorter threaded ends of the two rod portions are connected together by rotatably fastening each with the spacer nut.

To install the gun support system on the tree or upstanding support surface, the assembled components is positioned against the tree at a desired height and location, with the first brace being substantially oriented above the second brace along the rod. In an embodiment wherein two strap members are used as the attachment means, a first strap member encircles the tree and is positioned over the upper portion of the rod, and a second strap member encircles the tree and is positioned over the lower portion of the rod. In FIG. 2, the user can adjust the length of each of each strap members as needed. Each end of the respective strap members is secured together with the securing member. Finally, the user pulls downwardly on the rod to further tighten the strap members against the tree. This action helps remove any sagging in the strap members. Now, the user may place the firearm into the gun support system's receiving members. The stock or butt of the firearm rests against the stop member of the lower second brace and the lower receiving member. The upper portion of the firearm leans into and seats into the receiving member of the upper first brace. The upper receiving member can be further manipulated to secure the hold on the firearm by pressing (or expanding) the receiving member.

Those skilled in the art who have the benefit of this disclosure will appreciate that it may be used as the creative basis for designing devices or methods similar to those disclosed herein, or to design improvements to the invention disclosed herein; such new or improved creations should be recognized as dependent upon the invention disclosed herein, to the extent of such reliance upon this disclosure.

I claim:

1. A gun support system comprising:
   a. a supporting means for supporting a firearm, said supporting means comprising a first support member and a second support member, wherein each of said support members comprising a brace having a flange forming a substantially obtuse angle with the brace substantially abutting and bracing said gun support system against an upstanding support surface, and wherein each of said support members comprising a receiving member for supporting the firearm;
   b. a mounting means for removably mounting said supporting means thereto and for engaging with an attachment means, said mounting means comprising at least one rod having opposing ends, with each end of said rod engageable with each of said support members, respectively; and
   c. said attachment means for removably attaching said gun support system against the upstanding support surface, said attachment means comprising at least one attachment member.

2. The gun support system of claim 1, said receiving member of said first support member further comprising a U-shaped configuration, with said first support member further being adjustable for cradling the upper portion of the firearm, wherein the firearm seats against and is supported by said receiving member.

3. The gun support system of claim 1, said second support member further comprising a stop member, wherein said stop member supports the bottom of the firearm.

4. The gun support system of claim 1, each of said support members further comprising a fastener defining a hole therethrough for engaging with the respective ends of said rod.

5. The gun support system of claim 1, said flange and said receiving member of each of said first and second support members further comprising at least one layer of foam rubber or padding.

6. The gun support system of claim 1, said rod comprising a first portion and a second portion, wherein each said portion being connectable to the other said portion with a fastener, with each of said first portion of said rod and said second portion of said rod having an externally threaded end and an opposing end having a shorter externally threaded end, wherein the shorter externally threaded ends of said portions of said rod are connectable with said fastener, said fastener comprising a spacer nut defining an internally threaded hole therethrough.

7. The gun support system of claim 1, each of said attachment members is a strap member, said strap member comprising a first end, a second end, an adjusting means for adjusting the ends of said attachment member around the upstanding support surface having different diameters, and a securing member for securing the ends of said attachment member together around the upstanding support surface.

8. The gun support system of claim 7, said at least one attachment member comprising at least two strap members, with a first of said strap members being attachable over an upper portion of said rod and around the upstanding support surface, and a second of said strap members being attachable over a lower portion of said rod and around the upstanding support surface.

9. A gun support system for supporting a firearm on a tree, said gun support system comprising:
   a. a supporting means for supporting the firearm, said supporting means comprising a first support member for supporting the upper portion of the firearm and a second support member for supporting the lower portion of the firearm, each of said support members being a brace for substantially abutting and bracing said gun support system against the tree, wherein said brace comprises a receiving member for receiving and supporting the firearm;
   b. a rod having two opposing ends for removably mounting each of said support members thereto and for engaging with an attachment means; and
   c. said attachment means comprising a plurality of attachment members, each of said attachment members comprising a first end, a second end, an adjusting means for adjusting the ends of said attachment member around the tree having different diameters, and a securing member for detachably securing the ends of said attachment members together; wherein each of said attachment members being adjustable and temporarily attachable to the tree without drilling or impacting the tree, and wherein at least a first of the plurality of said attachment members being attachable over an upper portion of said rod and around the tree and at least a second of the plurality of said attachment members being attachable over a lower portion of said rod and around the tree.

10. The gun support system of claim 9, each of said support members further comprising a flange forming a substantially obtuse angle for substantially abutting the tree, and said receiving member forming a U-shape for supporting the firearm.

11. The gun support system of claim 10, said U-shaped receiving member of said first support member further being adjustable for cradling the upper portion of the firearm, wherein the firearm seats against and is supported by said receiving member, and said second support member further comprising a stop member, wherein said stop member supports the bottom of the firearm.

12. The gun support system of claim 10, said flange and said receiving member of each of said first and second support members further comprising at least one layer of foam rubber or padding.

13. The gun support system of claim 10, each of said first support member and said second support member further comprising a spacer nut defining an internally threaded hole therethrough for engaging with the respective ends of said rod; said rod further comprising a first portion and a second portion, each of said portions having an externally threaded end and an opposing end having shorter external threads, wherein the shorter externally threaded ends of said rod are connectable with a spacer nut defining an internally threaded hole therethrough.

14. A gun support system for supporting a firearm on or against a tree, said gun support system comprising:
   a. a first support member and a second support member, said first support member for supporting the upper portion of the firearm in a substantially upright position and said second support member for supporting the lower portion of the firearm, each of said support members having a brace for substantially abutting and bracing said gun support system against the tree and a fastener for engaging with a rod; said brace comprising a flange forming a substantially obtuse angle for substantially abutting the tree, and a U-shaped receiving member for receiving and supporting the firearm, wherein said U-shaped receiving member of said first support member further being adjustable for cradling the upper portion of the firearm, wherein the firearm seats against and is supported by said receiving member, and said second support member further comprising a stop member, wherein said stop member supports the bottom of the firearm; said support members being selectively oriented for access and retrieval of the firearm from either the left or the right of the gun support system;
   b. said rod comprising a first portion and a second portion, each of said portions having an externally threaded end and an opposing end having a shorter externally threaded end, wherein the shorter externally threaded ends of said portions of said rod are connectable with a fastener, wherein each opposing end of said rod being engageable with the fastener of each of said support members, and wherein said rod further engages with an attachment means; and
   c. said attachment means comprising at least two strap members, each for attaching said gun support system in a substantially parallel configuration on or against the tree.

15. The gun support system of claim 14, each of said fasteners comprising a spacer nut defining an internally threaded hole therethrough for rotatably engaging with one of the externally threaded ends of said rod.

16. The gun support system of claim 14, each of said strap members comprising a first end, a second end, an adjusting means for adjusting the ends of said attachment member around the tree having different diameters, and a securing member for securing the ends of said strap member together, a first of said strap members being attachable over an upper portion of said rod and around the tree and a second of said strap members being attachable over a lower portion of said rod and around the tree.

17. The gun support system of claim 14, each of said support members and said rod being selected from the group consisting of steel, stainless steel, aluminum, and combinations thereof; said flange and said receiving member of each of said first and second support members further comprising at least one layer of foam rubber or padding.

* * * * *